United States Patent [19]
Mosburger et al.

[11] Patent Number: 6,126,771
[45] Date of Patent: *Oct. 3, 2000

[54] CORRUGATED CARDBOARD MANUFACTURING PROCESS

[75] Inventors: Hans Mosburger, Weiherhammer/Opf.; Edmund Bradatsch, Weiden, both of Germany

[73] Assignee: BHS Corrugated Maschinen und Anlagenbau GmbH, Weiherhammer, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/894,378
[22] PCT Filed: Feb. 1, 1996
[86] PCT No.: PCT/DE96/00155
  § 371 Date: Dec. 10, 1997
  § 102(e) Date: Dec. 10, 1997
[87] PCT Pub. No.: WO96/26834
  PCT Pub. Date: Sep. 6, 1996

[30]  Foreign Application Priority Data

Feb. 27, 1995 [DE] Germany .................. 195 06 778

[51] Int. Cl.$^7$ .................................................. B31F 1/20
[52] U.S. Cl. .................... 156/205; 156/210; 156/462; 156/470; 156/583.3
[58] Field of Search .................................. 156/205, 210, 156/462, 470, 471, 472, 324, 583.1, 583.3; 428/186

[56]  References Cited

U.S. PATENT DOCUMENTS

| | | | |
|---|---|---|---|
| 690,713 | 1/1902 | Ferres | 156/471 |
| 1,146,771 | 7/1915 | Raffel | 156/470 |
| 1,199,508 | 9/1916 | Swift, Jr. | 156/205 |
| 1,802,880 | 4/1931 | Cumfer | 156/205 |
| 2,106,500 | 1/1938 | Greenwood | 118/44 |
| 2,384,676 | 9/1945 | Hill | 156/205 |
| 2,487,647 | 11/1949 | Goettsch | 154/32 |
| 3,293,107 | 12/1966 | Wells et al. | 428/186 |
| 4,096,305 | 6/1978 | Wilkinson et al. | 156/210 |
| 4,500,381 | 2/1985 | Nordstrom | 156/205 |
| 4,589,944 | 5/1986 | Torti et al. | 156/359 |
| 4,935,082 | 6/1990 | Bennett et al. | 156/205 |
| 5,071,507 | 12/1991 | Birke | 156/470 |
| 5,122,220 | 6/1992 | Seki | 156/470 |
| 5,456,783 | 10/1995 | Sissons | 156/210 |

OTHER PUBLICATIONS

Kroeschell, William O. ed. Corrugator Bonding: Physical Aspects of Single–Facer Operation. Tappi Press. Atlanta, GA. pp. 102, 103, 115, 117, 1993.

Corrugator Bonding; A TAPPI Press Anthology of Published Papers; Physical aspects of single–facer operation, pp. 37–38, 1993.

Primary Examiner—Michael W. Ball
Assistant Examiner—Gladys Piazza
Attorney, Agent, or Firm—Dennison, Scheiner, Schultz & Wakeman

[57]  ABSTRACT

The invention relates to a process for manufacturing corrugated board in which the corrugated board is produced by gluing at least three individual constituent webs (3, 5, 7) respectively on two sides oriented toward each other, wherein in a single work cycle, at a first glue application point (A), a first constituent web (3) is coated with glue and at a second assembly point (B), the first constituent web (3) is glued to a second constituent web (5) to form a half-finished web (31), and wherein in the same work cycle, at a second glue application point (D), glue is applied to a third constituent web (7) or to the half-finished web (31) and the third constituent web (7) is glued to the half-finished web (31) at a second assembly point (C) that is removed in the web travel direction in relation to the first assembly point (B). Furthermore, the invention relates to a device for carrying out the process according to the invention.

18 Claims, 3 Drawing Sheets

CORRUGATED CARDBOARD MANUFACTURING PROCESS

BACKGROUND OF THE INVENTION

The invention relates to a process and a device for manufacturing corrugated board, in particular, quintuple or double-double corrugated board.

For the assembly and gluing of at least three individual constituent webs, as is required, for example, in the manufacture of quintuple, i.e. so-called double-double corrugated board, up to this point, as a rule, a triple preheater has been used as an independent unit as well as a subsequently disposed double glue application mechanism, likewise used as an independent unit. With the aid of the glue application mechanism, two out of three webs to be glued are coated with glue on one surface and are supplied to a press device, together with another web that has not had glue applied to it. In other words: after glue is applied to two out of three webs to be glued together, they are assembled with the third web at a single point and the mutually opposing surfaces of the individual constituent webs are pressed against one another. As a rule, the assembly of the constituent webs takes place in a gluing machine with two inlet rolls oriented perpendicular to the web travel, by means of which the individual constituent webs are supplied to a heating section that serves to harden the glue and dry the finished web. In order to achieve a rapid gelling of the glue and thereby a rapid wet gluing after the assembly of the webs, it is necessary to heat at least the webs to be glued before the application of the glue. To this end, a preheater with a number of preheating cylinders is usually disposed before the double glue application mechanism.

With this known process and this known device for producing multilayer corrugated board, in particular, quintuple or double-double corrugated board, however, it is disadvantageous that relatively large web lengths are required between the glue application points of the double glue application mechanism and the assembly point of the individual constituent webs in the gluing machine. Depending on the temperature of the webs supplied to the gluing mechanism, this brings about the danger that too much moisture is extracted from the glue before the start of the gelling process, which has a disadvantageous effect on the adhesion strength of the glue when the individual constituent webs are brought together. Also, due to the size of the gluing mechanism, it is only possible—if at all—to shorten the web length of all of the constituent webs between the glue application point and the assembly point to the desired size when there is a large structural expenditure. Furthermore, the relatively large distances between the preheaters and the web assembly point results in an intense cooling of the individual webs, which at the same time leads to the fact that the web does not have the optimal temperature sought for the gluing.

SUMMARY OF THE INVENTION

The object of the invention, therefore, is to create a process and a device for producing corrugated board, wherein the above-mentioned disadvantages are prevented and a corresponding adhesion force of the glue is rapidly achieved after the assembly of the individual constituent webs.

Through the assembly of only two respective constituent webs in an assembly point and the concomitant positional separation of the two gluing mechanisms, it is possible to keep the web length between the glue application points and the assembly points small so that because of the correspondingly low web travel time, particularly at low speeds, an impermissibly large quantity of moisture is not withdrawn from the glue due to the penetration of moisture into the glued web.

The maximal web length between the glue application point and the assembly point is preferably chosen so that the web travel time is approximately 200 ms at maximal speed, which corresponds to a web length of approximately 1 m at a web speed of 300 m/min.

Since the webs are preheated before the glue application, there is the further advantage that in comparison to known processes and devices, the webs cool off significantly less leading up to the assembly point so that this heat is still available for the gelling and hardening of the glue as well as for the drying of the glued webs. The length of the subsequent heating section can be reduced as a result of this.

In the preferred embodiment of the process according to the invention, the half-finished web, i.e. the two constituent webs that have been glued together first, are heated between the first and second assembly point at least on the surface that is glued to the surface of the third constituent web oriented toward it at the second assembly point. This both accelerates the gelling process or the hardening of the glue and shortens the drying time for the finished corrugated board web. This supply of a sufficient quantity of heat to later intermediary layers of the finished web can likewise significantly shorten the length of the subsequent heating section in comparison to known devices.

In the preferred embodiment of the device according to the invention, the preheater, the press device, and/or the gluing mechanism are embodied so that they can be combined or integrated into one unit. This achieves the desired shortening of the web lengths between the preheater and the glue application point or between the preheater and the assembly point in a simple manner.

Embodying the preheater, the press device, and/or the gluing mechanism so that they can be assembled or integrated into one unit is naturally not limited to the case in which at least three constituent webs are glued together to form a corrugated board, but can also be used when only two individual constituent webs are to be glued to each other, as is the case, for example, in the manufacture of a double-sided corrugated board comprised of a one-sided corrugated board and a simple web.

In the preferred embodiment of the device according to the invention, a heating device is provided between the two assembly points and supplies a predetermined quantity of heat to both surfaces of the half-finished web. The unheated web length between this heating device and the second assembly point is likewise preferably kept as short as possible in order to prevent an unnecessary heat loss.

In one embodiment of the invention, the heating device disposed between the assembly points has a heated contact face for heating the one surface of the relevant web and one or more heated press shoes extending in the direction of and/or crosswise to the web movement direction, which press the web against the contact face and heat the other surface of the web. This preferably permits the elimination of an endless belt, which is disposed between the heated faces of the press shoes and is for transporting the web, in order to prevent a heat transfer resistance between the heated surfaces and the web surface.

In another embodiment of the invention, the heating device can be subdivided into a number of segments in the web movement direction, wherein the segments preferably heat the one or the other web surface in alternating fashion. In this way, a transport device, for example in the form of a driven, endless conveyor belt, can be provided again in each segment, and at the same time, the heating of both surfaces of the web can be assured. In contrast to the use of heated press shoes, though, the heating of the web surfaces does not happen simultaneously, but respectively in succession, so that the length of the heating device has to be chosen as correspondingly longer.

In an improvement of the device according to the invention, the heated contact faces of the segments can be embodied as alternatingly concave and convex so that by means of the web being pulled through the segments disposed one after the other, the web is pressed against the heated contact faces by means of the web tension alone. In this manner, the use of additional press elements can be eliminated. This heating device can also be used not only in connection with the process or device according to the invention, but also in connection with every other device for producing corrugated board or other devices for producing and treating webs.

In order to guarantee the necessary time for the withdrawal of moisture from the glue points when the web speed is increased, according to one embodiment of the invention, the gluing mechanism can, if necessary, be moved along with the mounted heating device so that the distance between the assembly point of the constituent webs and the respective application point of the glue is increased.

BRIEF DESCRIPTION OF THE DRAWINGS

The invention will be explained in detail below in conjunction with exemplary embodiments represented in the drawings.

DESCRIPTION OF THE PREFERRED EMBODIMENTS

Figure 1:
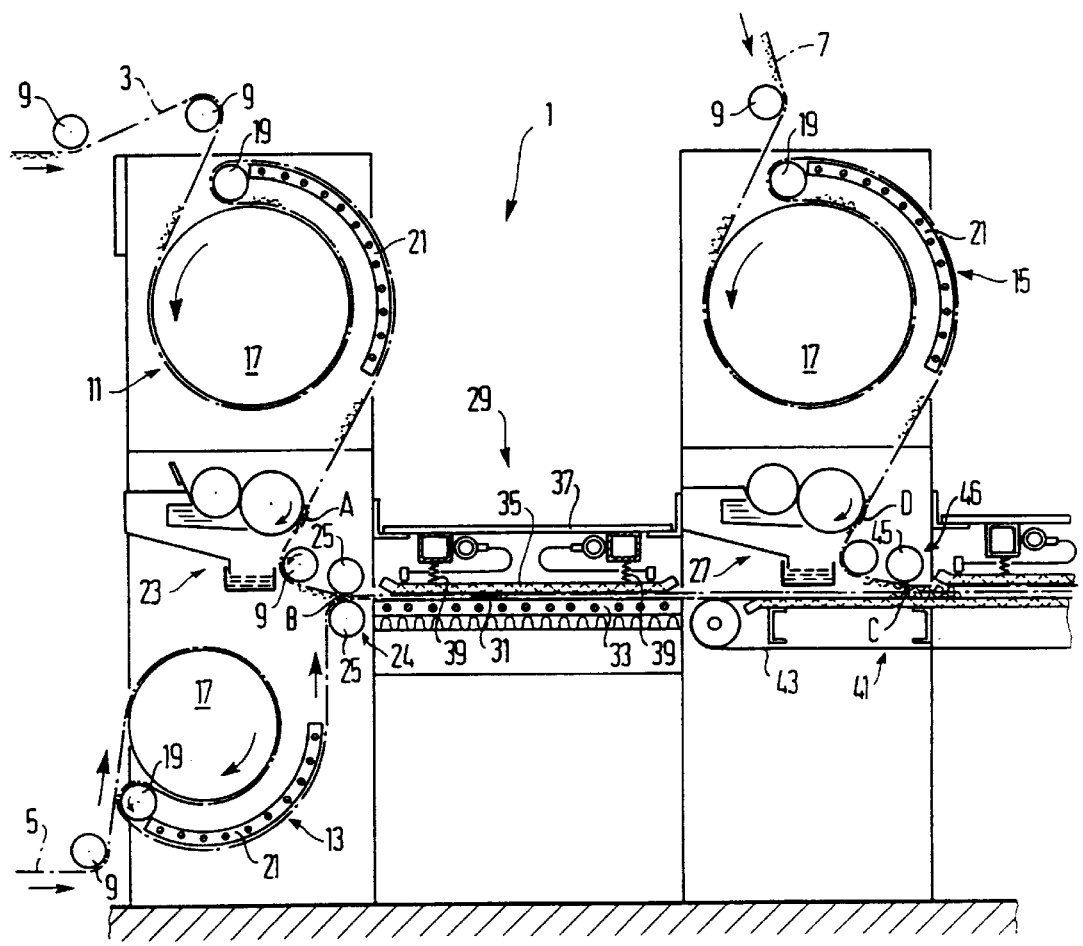
FIG. 1 shows a partially sectional schematic representation of an exemplary embodiment of the device according to the invention, for gluing at least three individual constituent webs.

The device represented in FIG. 1 is used for gluing together at least three individual constituent webs 3, 5, 7 and can as such be a component of a corrugated board apparatus, not shown. The exemplary embodiment shown in FIG. 1 explains the process according to the invention or the manner of function of the device according to the invention in the example of the manufacture of quintuple or so-called double-double corrugated board, which is comprised of three smooth webs and two corrugated webs disposed between the smooth webs and glued to them.

Double-double corrugated board is usually manufactured by bringing together and gluing two one-sided corrugated board webs and one smooth web. Correspondingly, the device 1 is supplied with a first one-sided corrugated board web 3, a smooth web 5, and a second one-sided corrugated board web 7. The one-sided corrugated board webs 3, 7 can be supplied in a standard way by one-sided corrugated board machines and the smooth web 5 can be supplied from a conventional unwinding device of the corrugated board apparatus, not shown in detail.

The supply of the three constituent webs 3, 5, 7 is respectively carried out by means of one or two deflection rolls 9. As is standard in the production of multi-layer corrugated board, the individual constituent webs are first supplied to preheaters 11, 13, 15, and the webs are heated before the glue application and the respective assembly and gluing together.

As shown in FIG. 1, in comparison to conventional preheaters, the preheaters 11, 13, 15 are embodied so that not just one but both surfaces of the web supplied to the preheater are heated.

To this end, each preheater 11, 13, 15 has a heated drum 17. This can be heated internally, for example by means of steam or in some other manner. The drums 17 are supported in rotary fashion and can be respectively driven in the arrow direction indicated. The drum jacket is comprised of very heat-conductive material, preferably metal.

The webs 3, 5, 7 supplied to the preheaters 11, 13, 15 rest with the surface oriented toward the drum 17 against the drum jacket and wind around the drum with a predetermined winding angle. As they exit the drum, the webs 3, 5, 7 are guided by means of a deflection roll 19 that is preferably supported in rotary fashion. From the roll 19, the webs 3, 5, 7 travel further via a heating face 21 against which they rest with the surface that was not previously heated by the drum 17 as a result of the deflection by means of the relevant roll 19. In this manner, both surfaces of the webs 3, 5, 7 supplied to the preheaters 11, 13, 15 can be heated.

Each heating face 21 is connected to the deflection roll 19 so that both can be pivoted concentrically to the axis of the drum 17. In this manner, the device comprised of the heating face 21 and the deflection roll 19 can be pivoted out of the position shown in FIG. 1, which has the maximal possible winding angle of the relevant web (3, 5, 7) around the drum 17, until they are in a position in which the web winds around the drum 17 with the minimal angle, wherein in this position, the surface of the web 3, 5, 7 previously resting against the heating face 21 is completely lifted away from the heating face. In the position with the smallest winding angle, therefore, only the surface of the web 3, 5, 7 resting against the jacket of the drum 17 is heated.

As shown in FIG. 1, the one-sided corrugated board web 3 is first heated in the desired manner, for example on both sides, by means of the preheater 11 and then is supplied to a first gluing mechanism 23. The gluing mechanism 23 can be of a known type. After the application of the glue onto the ribs of the corrugated web of the one-sided corrugated board 3, this is supplied via another deflection roll 19, together with the smooth web 5 to a press device 24 in the form of a pair of cooperating rolls 25. The supply of the smooth web 5 is carried out in an analogous manner, i.e. the web 5 is also supplied with a predetermined quantity of heat on both surfaces by means of the preheater 13. The rolls 25 now press the smooth web 5 against the glue-coated ribs of the one-sided corrugated board web 3 and thus carry out the gluing together of the two webs.

Through the relatively small web length of the web 3 between the exit from the heating face 21 of the preheater 11 and the glue application point A in the gluing mechanism 23, only a relatively slight cooling occurs during the movement of the web between these points. In comparison to known machines in which the relevant web length between the exit from the heating face of the preheater and the glue application point is approximately 3 m or more, in the device according to FIG. 1 achieves a significantly shorter web length through the direct positioning, mounting, or integration of the preheater onto or into the gluing mechanism. Concretely, web lengths of less than 1 m, preferably less than 0.5 m can be achieved, which with a web speed of 300 m/min, corresponds to a web travel time of 200 ms or 100 ms. As a result of the low web length between the preheater and the glue application point and the slight cooling of the web connected with it, the gelling process of the glue after it is applied to the web acts more rapidly than in known machines so that after the assembly of the webs 3 and 5, a wet gluing occurs very rapidly with a sufficiently high adhesion force.

At least as important as a low web length between the preheater and the glue application point is the achievement of as optimal as possible a web length between the glue application point A and the gluing point or assembly point B, which is disposed between the two rolls 25 in the exemplary embodiment shown in FIG. 1. A short web length between the glue application point A and the assembly point B assures that during the travel time of the web between these two points, an impermissibly large quantity of moisture is not withdrawn from the glue due to the capillary action of the web surface, which would have a disadvantageous effect on the adhesion force.

Whereas in known devices for gluing at least three individual constituent webs, two of the constituent webs are coated with glue and then brought together with the third constituent web at a single assembly point, with the device according to FIG. 1 or with the process realized by means of this device, initially only the first constituent web is glued to the second constituent web and only after this is the third constituent web glued to the half-finished web thus produced. Through the use of two assembly points or gluing points B and C, only a single gluing mechanism 23 or 27 must be disposed before each assembly point B, C, and precisely for this reason, this gluing mechanism 23 can be brought very close to the assembly point B or C and makes an integration of a preheater easier. This is not possible—or can only be achieved with a large structural expenditure—when two gluing mechanisms are used before a single assembly point, due to the size of the gluing mechanisms.

In comparison to known devices in which the distance between the unwinding point, the preheater, and the assembly point B is 5 m or more, with the process or the device according to the invention, as a result of bringing the gluing mechanism, along with the preheaters, close to the assembly point, which is now possible, a web length of 1.5 m or less can be achieved. At the same time, the web length between the glue application point A and the assembly point B is shortened by approximately 2 m to approximately 0.5 m.

Preferably, the web length between the glue application point and the assembly point is less than 1 m, which at a web speed of 300 m/min corresponds to a web travel time between the points A and B of less than 200 ms. Between the glue application point A and the assembly point B, an additional heating device, not shown, can be provided for the corrugated side.

After the assembly and gluing of the webs by means of the pair of rolls 25, the half-finished web is supplied to a heating device 29, which—as shown in FIG. 1—preferably heats both surfaces of the half-finished web 31 comprised of the webs 3 and 5 glued together.

To this end, the heating device 29 has a heated plate 33, which the half-finished web 31 rests against with its one surface (the bottom one in FIG. 1). The heating device 29 additionally includes one or more heated press shoes 35, which preferably press the half-finished web against the heated undersides of the press shoes 35 and respectively against the surface of the heated plate 33 due to spring action by means of springs 39 disposed in a frame 37. Naturally, both a number of press shoes disposed one after the other in the web movement direction and a number of press shoes lateral to the web can be provided. This achieves a uniform pressing of the half-finished web even when there is a slight unevenness of the web or of the heated surfaces.

The heating of both surfaces of the webs 3 and 5 supplied as well as the small web length between the preheater and assembly point B, simultaneously achieve the fact that it is possible to keep the length of the heating device 29 relatively short since this is not intended to produce the complete hardening of the glue and drying of the half-finished web 31, but essentially serves to achieve a sufficiently firm (wet-) gluing inside the half-finished web before the supplying and gluing of the half-finished 31 to the third web 7.

Furthermore, the heating device 29 has the task of introducing additional heat into the surface that adjoins the heated press shoes 35 and is glued to the preheated one-sided corrugated board web 7. This heat introduced into the half-finished web serves to achieve a more rapid gluing of the web 7 to the web 31, which at a later point achieves a more rapid hardening and drying of the finished double-double corrugated board web.

The supply of the one-sided corrugated board web 7 is carried out in the manner described above for the supply of the one-sided corrugated board web 3. Bringing the preheater 15 as close as possible to the gluing mechanism 27 and disposing the gluing mechanism 27 as close as possible to the assembly point C in turn achieves the advantages already described above. The same is true for the double-sided heating of the one-sided corrugated board web 7 supplied.

Following the heating device 29, the half-finished web 31 passes through another heating device 41, e.g. in the form of heating shoes 41', which only heats the upper surface of the half-finished web 31, though, and in addition has an endless conveyor belt 43 for the movement of the half-finished web 31 through the device according to the invention. The endless conveyor belt 43 can also be heated. Furthermore, the endless belt 43 of the heating device 41, together with a press roll 45, constitutes a press device 46 for assembling and gluing the half-finished web 31 to the one-sided corrugated board web 7 at the assembly point or gluing point C.

Figure 2:
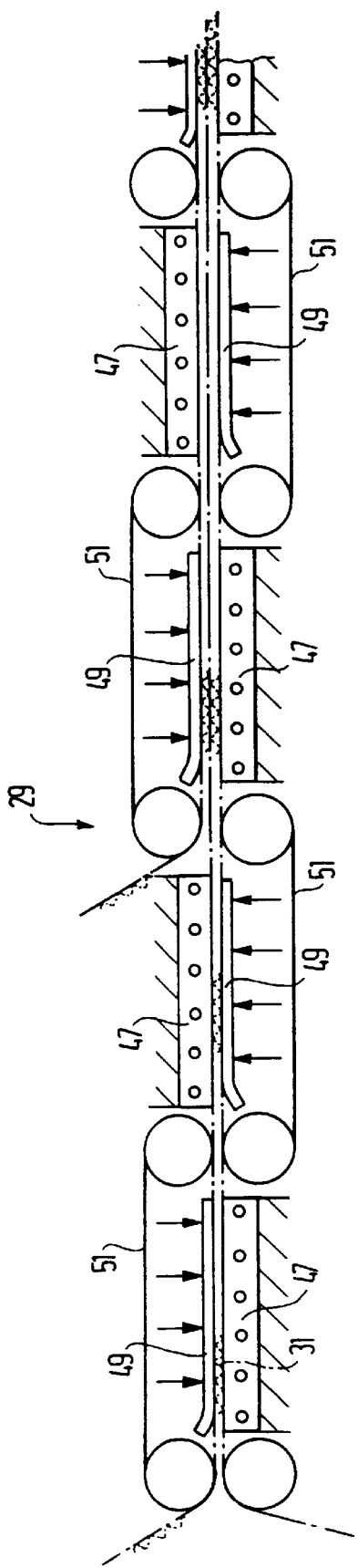
FIG. 2 shows a partially sectional schematic representation of another exemplary embodiment of the heating device in FIG. 1

FIG. 2 shows another embodiment of the heating device 29 according to which the heating device is subdivided into individual segments in the movement direction of the half-finished web 31 and these segments serve to alternatingly heat the one or the other surface of the half-finished web 31. The individual segments are designed practically identically, but are alternatingly disposed in mirror image fashion on either side of a horizontal axis. Each segment is comprised of a stationary heated plate 47 with which one or several press shoes 49 cooperate. In contrast to the press shoes 35, though, the press shoes 49 are not heated and therefore can exert their pressure onto the half-finished web 31 by means of a revolving, endless belt 51, wherein the endless belt 51 carries out the transport of the half-finished web 31 through the device according to the invention.

The heating device 41 could also be embodied in the same way.

Figure 3:
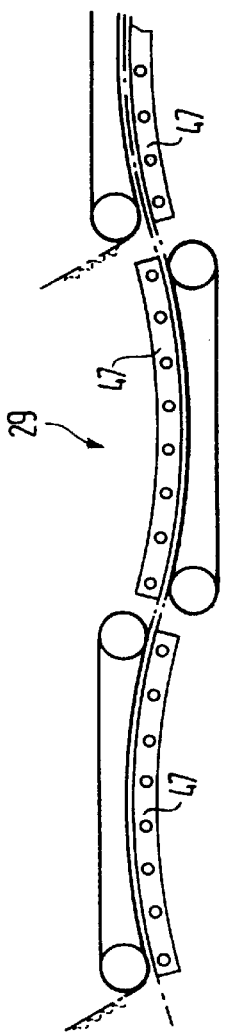
FIG. 3 shows a third embodiment of the heating device of the apparatus in FIG. 1.

In another embodiment of the heating device 29 according to FIG. 3, the heating plates 47 can be embodied as alternatingly concave and convex so that no press shoes are necessary for pressing the half-finished web 31 against the heated surface of the plates 47 since the pressing is already achieved by means of the tension in the half-finished web 31.

Figure 4:
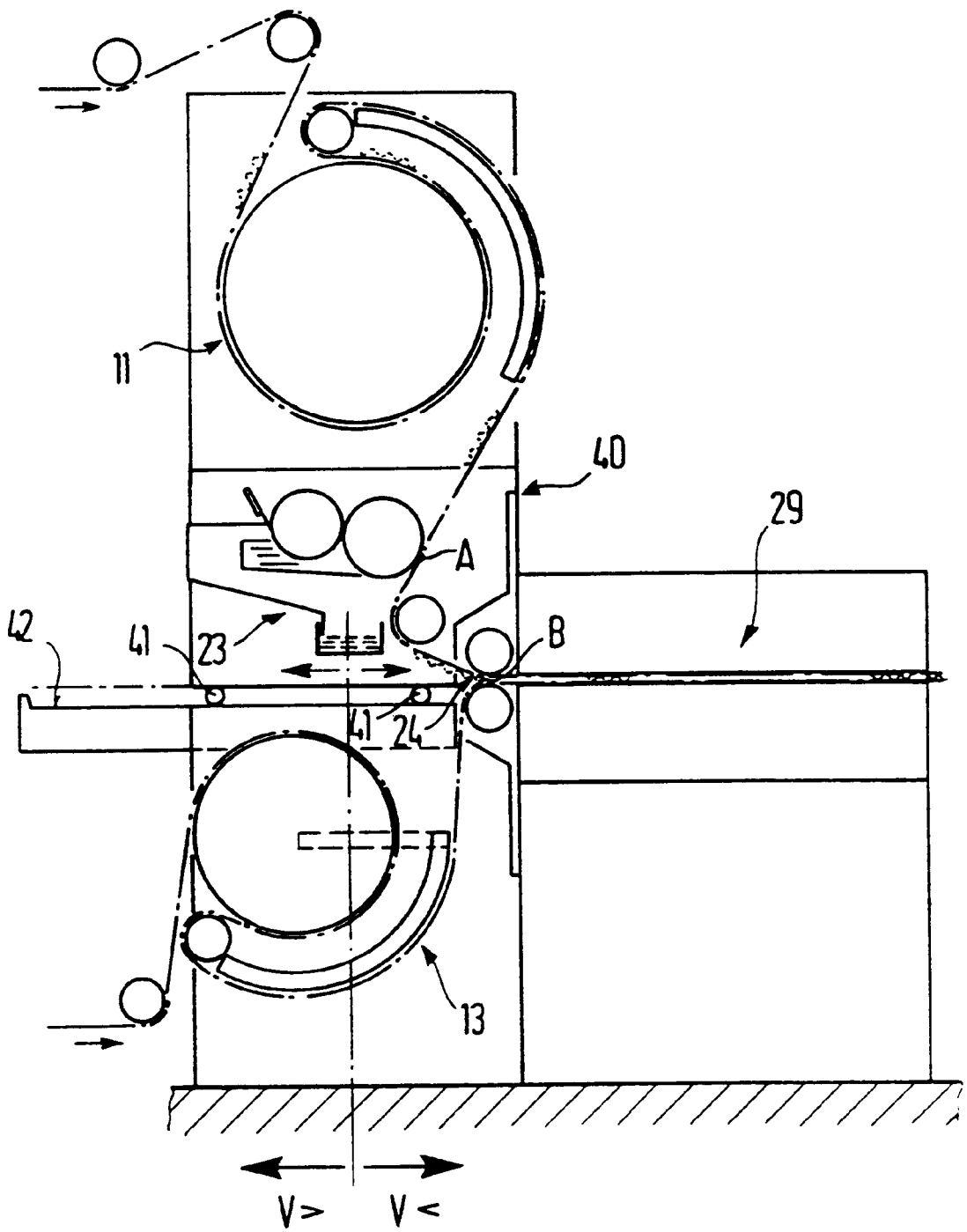
FIG. 4 shows a schematic partial view of FIG. 1, with a movable unit for the gluing mechanism and preheater.

As shown in FIG. 4, the gluing mechanism 23 and the preheater 11 are combined into one unit 40. The unit 40 is movably supported on the preheater 13 so that it can move by means of rolls 41 on projecting rails 42.

If the web speed V is increased, the unit 40 can be moved toward the left in the drawing of FIG. 4. This increases the distance between the glue application point A and the constituent web assembly point B constituted by the press device 24. In this manner, the sufficient moisture withdrawal of the glue application is assured despite the increased web speed. The moisture withdrawal of the glue application is carried out by means of the capillary action of the constituent web.

In the same manner, the unit, not shown, which adjoins the heating device 29 and contains the preheater 15 and the gluing mechanism 27, can be embodied so that it can move.

The moving of the unit 40 can be carried out manually or automatically as a function of the web speed V. A conventional drier section can come after it.

What is claimed is:

1. A process for manufacturing corrugated board, by gluing together at least three individual constituent webs together on facing surfaces of the webs, comprising the steps of:
    a) in a work cycle, at a first point, a glue application point, coating a first web with glue;
    b) at a second point, an assembly point, gluing the first web to a second web to form a half-finished web by passing the first web and the second web through a press device;
    c) in said work cycle, at a third point, a glue application point, coating a facing surface of a third web with glue;
    d) downstream of the second point, an assembly point, heating opposite faces of the half-finished web by passing the web through a heating device comprising a heated press shoe opposite a first face of the half-finished web and a heated plate opposite a second face of the half-finished web opposite to the first face, without application of glue thereto; and
    e) at a fourth point, an assembly point that is downstream in relation to the second, assembly point, gluing together facing surfaces of the third web and the heated, half-finished web by passing the third web and the heated, half-finished web through a press device, to form the corrugated board.

2. The process according to claim 1, wherein the web travels between the first point, a glue application point, and the second point, an assembly point, in a time less than or equal to 200 ms.

3. The process according to claim 1, wherein at least one of said first and third webs is preheated before being coated with glue.

4. The process according to claim 1, wherein the second web is not coated with glue and is also heated before being glued with the first web.

5. The process according to claim 3, wherein the at least one web which is preheated travels between the end of preheating and a subsequent glue application point in a time less than or equal to 200 ms.

6. The process according to claim 1, wherein the corrugated board is heated on at least one surface after gluing together said third web and said half-finished web.

7. The process according to claim 1, wherein the first point, a glue application point and second point, an assembly point are separated by a distance which is changed as a function of web speed.

8. The process according to claim 1, wherein the third point, a glue application point and fourth point, an assembly point are separated by a distance which is changed as a function of web speed.

9. The process according to claim 1, wherein the corrugated board is heated on at least one surface after assembly of all webs.

10. The process according to claim 1, wherein the web travels between the third point, a glue application point, and the fourth point, an assembly point, in a time less than or equal to 200 ms.

11. A device for manufacturing corrugated board by gluing together at least three individual webs on two facing surfaces comprising:
    a) a first gluing mechanism for applying glue to a first web;
    b) a first press device disposed downstream of the first gluing mechanism for assembling and gluing together the first web supplied thereto coated with glue and a second web supplied thereto to form a half-finished web;
    c) a second gluing mechanism for applying glue to a facing surface of a third web;
    (d) a second press device for assembling and gluing together an unglued facing surface of the half-finished web and the glued facing surface of the third web; and
    (e) a heating device provided between the first and second press devices constructed and arranged for heating both surfaces of the half-finished web, said heating device comprising a heated press shoe and a heated plate constructed and arranged such that the half-finished web passes therebetween.

12. The device according to claim 11, additionally comprising at least one preheater constructed and arranged for heating at least one surface of the first web disposed upstream of either the first gluing mechanism or upstream of the first press device.

13. The device according to claim 11, additionally comprising at least one preheater constructed and arranged for heating at least one surface of the third web disposed upstream of either the second gluing mechanism or upstream of the second press device.

14. The device according to claim 12, wherein web length between the first preheater the first press device is minimized.

15. The device according to claim 14, wherein the preheater, the first press device, and/or the first gluing mechanism are constructed and arranged to be integrated or combined into a single unit.

16. The device according to claim 11, wherein the heating device comprises a heated contact face for heating one surface of the half-finished web and at least one heated press shoe extending laterally with respect to web movement and which presses one face of the half-finished web against the contact face and heats an opposite face of the half-finished web.

17. The device according to claim 11, wherein the gluing mechanisms are movable so that its distance to its respective press device can be increased as web speed increases and decreased as web speed decreases.

18. The device according to claim 17, wherein the distance increase or decrease is carried out manually or automatically by moving the gluing mechanism.

* * * * *